United States Patent [19]

Kimura et al.

[11] 4,369,230

[45] Jan. 18, 1983

[54] MAGNETIC RECORDING MEDIUM

[75] Inventors: Shigeo Kimura, Tagajo; Masashi Somezawa, Sendai; Kunio Kobayashi, Izumi; Minoru Takamizawa, Annaka; Yoshio Inoue, Annaka; Hiroshi Yoshioka, Annaka, all of Japan

[73] Assignees: Sony Corporation; Shin-Etsu Chemical Co., Ltd., both of Tokyo, Japan

[21] Appl. No.: 267,922

[22] Filed: May 28, 1981

[30] Foreign Application Priority Data

May 28, 1980 [JP] Japan .................... 55-71065

[51] Int. Cl.³ .................... G11B 5/68; G11B 5/72
[52] U.S. Cl. .................... 428/421; 252/62.54; 360/134; 427/128; 427/131; 428/447; 428/695; 428/900
[58] Field of Search ........... 428/695, 900, 421, 447; 252/62.53, 62.54; 427/128, 131; 360/134, 135, 136

[56] References Cited

U.S. PATENT DOCUMENTS

| | | | |
|---|---|---|---|
| 4,005,242 | 1/1977 | Kopke et al. | 252/62.54 |
| 4,007,313 | 2/1977 | Higuchi et al. | 428/900 |
| 4,007,314 | 2/1977 | Higuchi et al. | 427/128 |
| 4,110,503 | 8/1978 | Ogawa et al. | 428/900 |
| 4,131,717 | 12/1978 | Himino et al. | 428/447 |
| 4,135,016 | 1/1979 | Ogawa et al. | 428/900 |
| 4,171,406 | 10/1979 | Yamaguchi et al. | 428/695 |
| 4,267,206 | 5/1981 | Johnson | 427/128 |

Primary Examiner—Stanley S. Silverman
Attorney, Agent, or Firm—Hill, Van Santen, Steadman, Chiara & Simpson

[57] ABSTRACT

A magnetic recording medium having a layer containing as a lubricant one or more organo-polysiloxane compounds having the following formula (I):

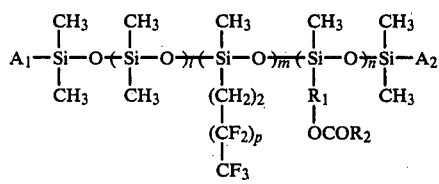

(wherein each of $A_1$ and $A_2$ is independently $—CH_3$, $—CH_2—CH_2—(CF_2)_q—CF_3$ or $—R_1OCOR_2$; $R_1$ is a divalent hydrocarbon residue having 1 to 5 carbon atoms; $R_2$ is a monovalent hydrocarbon residue having from 7 to 21 carbon atoms; each of l, m and n is independently O or an integer ranging from 1 to 200; and each of p and q is independently O or an integer ranging from 1 to 12; provided that when at least one of the groups $A_1$ and $A_2$ is the group $—R_1OCOR_2$, each l, m and n may be O and that, when each group $A_1$ and $A_2$ is one of the groups other than the group $—R_1OCOR_2$, each l and m may be O and n is an integer ranging from 1 to 200).

19 Claims, 4 Drawing Figures

MAGNETIC RECORDING MEDIUM

BACKGROUND OF THE INVENTION

1. Field of the Invention

This invention is in the field of magnetic recording media including a non-magnetic base and a magnetic layer containing magnetizable particles dispersed in a binder. The invention is concerned with an improved lubricating layer consisting of one or more organopolysiloxane compounds.

2. Description of the Prior Art

A magnetic recording medium which is used for audio recording, video recording, or other magnetic recording purposes during use is in contact with guide members, magnetic heads, and the like. In the case of a video tape recorder, where high tape velocities are encountered, the tape must have sufficiently high wear resistance and a relatively small friction coefficient if it is to run smoothly and steadily for a long time. Moreover, the magnetic powder layer including magnetizable particles on such a recording medium must be sufficiently bound to the base to resist shedding or loosening of the powder during use. The magnetic tape must also have good splicing ability.

Magnetic recording media which have relatively high friction coefficients vibrate at the guide members and/or the magnetic heads during recording and/or reproducing so that the recorded signals or the reproduced signals deviate from the original signals with respect to frequency. In some cases, fluttering of the magnetic recording medium can occur to produce the so-called "Q" sound due to the vibration of the recording media.

Various attempts have been made to overcome the above-described defects and to impart lubricity or smoothness to a magnetic recording media, but no completely satisfactory lubricant for magnetic recording media has yet been developed. For example, it has been suggested to use solid lubricants such as molybdenum disulfide, graphite or a wax such that the lubricant is mixed into the magnetic layer containing a magnetic powder such as gamma-Fe₂O₃, and a binder, such as polyvinyl chloride. Such solid lubricants are ineffective to improve the durability of the magnetic recording media. When a large quantity of the solid lubricant is mixed into the magnetic layer, the magnetic performance of the recording media is impaired. It has also been suggested to use lubricants such as higher fatty acids or esters, or paraffinic hydrocarbons and silicone oils such as dimethylsilicone oil or diphenylsilicone oil as lubricating agents. These lubricants do not provide sufficient durability and lubricity so that magnetic recording media containing these lubricants cannot be effectively used in cassettes for video tape recorders. Magnetic recording media containing large quantities of such lubricants may cause "bleeding" or "blooming" resulting from the lubricant oozing or diffusing onto the surface of the magnetic layer and becoming separated therefrom. Bleeding or blooming which occur on the magnetic layer may cause a stick-slip in which layers of tape wound upon themselves stick to each other.

It has further been suggested that certain organopolysilicone compounds could be employed as lubricants for providing lubricity to magnetic recording media. For example, U.S. Pat. No. 3,993,846 to Higuchi et al discloses a polyoxyalkylene substituted silicone compound having the formula:

$$RO(CHR''CH_2O)_{n_1}(SiCH_3CH_3O)_m(CH_2CHR''O)_{n_2}R'$$

(wherein R and R' stand for an aliphatic hydrocarbon group having from 8 to 18 carbon atoms, R'' is a hydrogen atom or methyl group, m is an integer ranging from 1 to 15 and $n_1$ and $n_2$ are integers whose sums range from 2 to 16).

This lubricant exhibits considerable promise in providing an improved magnetic recording medium wherein at least some if not all of the aforementioned prior art problems are alleviated.

U.S. Pat. No. 4,007,314 to Higuchi et al discloses an organosilicone lubricant compound having the formula:

$$(RCOO)_nSi(CH_3)_{4-n}$$

(wherein R is an aliphatic hydrocarbon group containing from 7 to 17 carbon atoms and n is an integer ranging from 1 to 3).

This lubricant also exhibits considerable promise in providing a magnetic recording medium with improved lubrication properties.

Hirano et al in U.S. Pat. No. 4,131,717 disclosed a magnetic recording medium including a non-magnetic base and a magnetic layer thereon which contains and/or is coated with an organopolysiloxane having an average unit represented by the formula:

$$(CH_3)(RO)_n(R'COO)_mSiO_{3-n-m/2}$$

(wherein R is a monovalent hydrocarbon group having from 1 to 5 carbon atoms, R' is a monovalent aliphatic hydrocarbon group having from 7 to 17 carbon atoms, n is zero or a positive number, m is a positive number provided that n+m is less than 3 and the number of Si atoms in a molecule of such organopolysiloxane ranges from 2 to 8).

Magnetic recording media containing such lubricants exhibit a substantially reduced dynamic friction coefficient and a substantially reduced tendency for the magnetic layer to lose its magnetic properties, along with an improved splicing ability.

In U.S. Pat. No. 4,007,313 to Higuchi et al there is disclosed a lubricant for magnetic recording media comprising an organosilicone-fluoride compound having the formula:

$$(RCOO)_nSi(CH_3)_{3-n}$$
$$|$$
$$CH_2CH_2CF_3$$

(wherein R is an aliphatic hydrocarbon group having from 7 to 17 carbon atoms and n is an integer ranging from 1 to 3).

This lubricant also exhibits considerable promise in providing an improved magnetic recording medium.

While the lubricants disclosed in the above prior patents are improvements over prior art lubricants, it is nevertheless desirable to provide even further improved lubricants for use with magnetic recording media.

SUMMARY OF THE INVENTION

The present invention seeks to provide an improved magnetic recording medium containing a lubricant that imparts improved lubricity or smoothness to the medium. The lubricant provides durability to the recording medium permitting it to run smoothly and steadily while being in contact with guide members and magnetic heads. The magnetic recording medium of the present invention contains a lubricant which can improve and stabilize magnetic performance in the still mode, which tends to vary over a period of time.

The lubricant of the present invention provides improved lubricating properties to a magnetic recording medium whereby the defects and disadvantages prevailing in conventional and prior art lubricants can be substantially reduced.

In accordance with the present invention, a magnetic recording medium is provided with a non-magnetic base and a magnetic layer formed thereon which includes magnetizable particles dispersed in a binder. The base or the overlying layer contains an improved lubricant which provides improved properties as hereinabove set forth.

The lubricants used in the practice of the present invention are organo-polysiloxane compounds represented by the following formula (I):

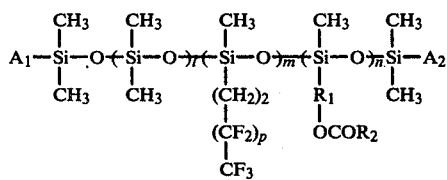

(wherein each of $A_1$ and $A_2$ is independently $-CH_3$, $-CH_2-CH_2-(CF_2)_q-CF_3$ or $-R_1OCOR_2$; $R_1$ is a divalent hydrocarbon residue having 1 to 5 carbon atoms; $R_2$ is a monovalent hydrocarbon residue having from 7 to 21 carbon atoms; each of l, m and n is independently 0 or an integer ranging from 1 to 200; and each of p and q is independently 0 or an integer ranging from 1 to 12; provided that when at least one of $A_1$ and $A_2$ is the group $-R_1OCOR_2$, each of l, m and n may be 0 and that, when both $A_1$ and $A_2$ are groups other than the group $-R_1OCOR_2$, each of l and m may be 0 and n is an integer ranging from 1 to 200).

DESCRIPTION OF THE PREFERRED EMBODIMENTS

Figure 1A:
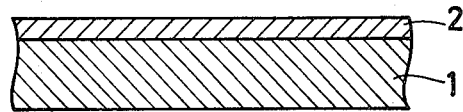
FIGS. 1A through 1E are examples illustrating magnetic recording media which are provided with improved layers according to the present invention in various locations.

The present invention provides an improved magnetic recording medium having a non-magnetic base and a magnetic layer thereon comprising magnetic or magnetizable particles dispersed in a binder, the base being provided with a layer which contains at least one of the lubricants described in this application.

The organo-polysiloxane compounds which can be employed for the purposes of the present invention may be represented by the following formula (I):

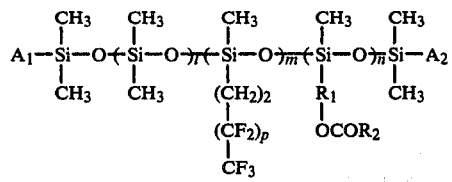

(wherein each of $A_1$ and $A_2$ is independently $-CH_3$, $-CH_2-CH_2-(CF_2)_q-CF_3$ or $-R_1OCOR_2$; $R_1$ is a divalent hydrocarbon residue having 1 to 5 carbon atoms; $R_2$ is a monovalent hydrocarbon residue having from 7 to 21 carbon atoms; each of l, m and n is independently 0 or an integer ranging from 1 to 200; and each of p and q is independently 0 or an integer ranging from 1 to 12; provided that when at least one of the groups $A_1$ and $A_2$ is the group $-R_1OCOR_2$, each of l, m and n may be 0 and that, when both $A_1$ and $A_2$ are one of the groups other than the group $-R_1OCOR_2$, each of l and m may be 0 and n is an integer ranging from 1 to 200).

The term "divalent hydrocarbon residue" referred to hereinabove is intended to mean a divalent, straight chained or branched chained, saturated or unsaturated, aliphatic hydrocarbon residue. The hydrocarbon residue may include a divalent, straight or branched chained, lower alkylene group or lower alkenylene group. The alkylene group referred to herein may include, for example, methylene, ethylene, propylene, methylethylene, ethylmethylene, butylene, pentylene, methylpropylene, ethylpropylene, methylbutylene and propylmethylene. The alkenylene group referred to herein may include, for example, ethenylene, propenylene, methylethenylene, butenylene, methylbutenylene, heptenylene and methylpropenylene. The term "monovalent hydrocarbon residue" may include a monovalent, straight or branched chain, saturated or unsaturated hydrocarbon residue. The monovalent hydrocarbon residue may include, a monovalent, straight or branched chain, higher alkyl or higher alkenyl group. The higher alkyl group may include, for example, heptyl, octyl, nonyl, decyl, undecyl, tridecyl, pentadecyl, heptadecyl, nonadecyl, heneicosyl, methylheptyl, ethylheptyl, methylnonyl, methylethylhexyl, methyltridecyl, propylhexadecyl, ethylnonadecyl and methyleicosyl. The higher alkenyl group may include, for example, heptenyl, octenyl, nonenyl, decenyl, undecenyl, tridecenyl, pentadecenyl, heptadecenyl, nonadecenyl, heneicosenyl, methylhexenyl, ethylpentenyl, methylmethylhexenyl, propylheptenyl, methyldodecenyl, ethyltridecenyl, methyltetradecenyl, ethylhexadecenyl, methyloctadecenyl and ethylnonadecenyl.

In the aforesaid formula (I), it is preferred to restrict the quotient obtained by dividing n by the sum of $1+m+n+2$ to a value equal to or greater than 0.2.

The organo-polysiloxane compounds to be employed as lubricants in the practice of the present invention may be prepared by several different procedures, for example, as follows:

(1) Addition reaction procedure:

The organo-polysiloxane compounds of formula (I) may be prepared by subjecting a silane compound represented by the following formula (II):

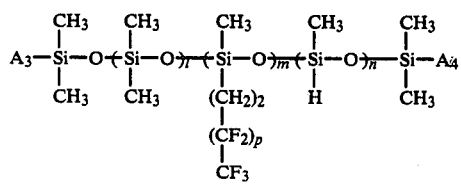

(wherein each of $A_3$ and $A_4$ is independently a hydrogen atom, $-CH_3$ or $-CH_2CH_2(CF_2)_qCF_3$; and l, m, n, p and q have the same meanings as hereinabove defined) to an addition reaction with an ester compound represented by the formula (III):

$R_3-OCOR_2$ (wherein $R_3$ is a monovalent unsaturated hydrocarbon residue and $R_2$ has the same meaning as defined above) in the presence of a platinum catalyst.

In formula (III), the term "monovalent unsaturated hydrocarbon residue" referred to hereinabove is intended to mean a group which provides the group $R_1$ as defined in formula (I) when the addition reaction of the silane compound of the formula (II) with the ester compound of formula (III) is carried out. The monovalent unsaturated hydrocarbon residue may contain, for example, 3 to 5 carbon atoms.

(2) Dehydrochlorination or dealkalization procedures:

The organo-polysiloxane compounds of formula (I) may be prepared by reacting a compound represented by the formula (IV):

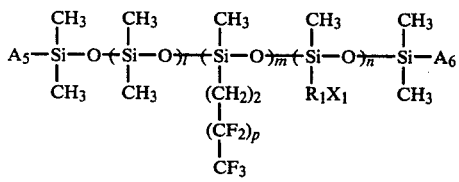

(wherein each of $A_5$ and $A_6$ is independently $-CH_3$, $-CH_2CH_2(CF_2)_qCF_3$ or a halogenated hydrocarbon residue represented by the formula: $-R_1X_2$ (in which $X_2$ is a halogen atom); $X_1$ is a halogen atom; and $R_1$, l, m, n, p and q have the same meanings as defined hereinabove) with a fatty acid represented by the formula (V):

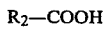

$R_2-COOH$ (wherein $R_2$ has the same meaning as defined hereinabove) or with a fatty acid salt represented by the formula (VI):

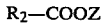

$R_2-COOZ$ (wherein Z is an alkali metal or one valence of an alkaline earth metal and $R_2$ has the same meaning as defined hereinabove).

In the compound of the formula (IV), the term "halogen atom" referred to herein is intended to mean, for example, chlorine or bromine. The term "halogenated hydrocarbon residue" in the symbols $A_5$ and $A_6$ as represented by the group: $R_1X_2$ means a group consisting of the divalent hydrocarbon residue $R_1$ substituted by a halogen atom $X_2$ which is selected from, for example, chlorine and bromine. In the fatty acid salt of the formula (VI), the term "alkali metal" referred to therein means, for example, sodium or potassium and the term "alkaline earth metal" referred to therein means, for example, calcium.

(3) Dechlorination or dehydration-esterification procedure:

The organo-polysiloxane compounds of formula (I) may be prepared by reacting a hydroxy-containing compound represented by the formula (VII):

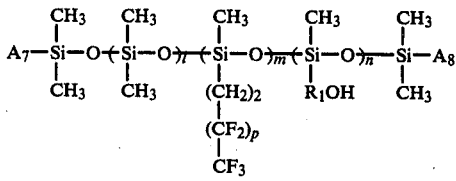

(wherein each of $A_7$ and $A_8$ is independently $-CH_3$, $-CH_2CH_2(CF_2)_qCF_3$ or the group: $-R_1OH$; and $R_1$, l, m, n, p and q have the same meanings as defined hereinabove) with an acid halide represented by the formula (VIII):

$R_2-COX_3$ (wherein $X_3$ is a halogen atom and $R_2$ has the same meaning as defined hereinabove) or with a fatty acid of the formula (V):

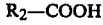

$R_2-COOH$ (wherein $R_2$ has the same meaning as defined hereinabove).

In the acid halide of the formula (VIII), the term "halogen atom" referred to therein means a halogen atom as defined for the halogen atoms for the symbols $X_1$ and $X_2$ referred to hereinabove.

In the organo-polysiloxane compounds of formula (I), where an ester moiety represented by the group $-OCOR_2$ is bound through the divalent hydrocarbon residue represented by the group $-R_1-$ having from 1 to 5 carbon atoms, the binding of the ester group to the Si atom is rendered much stronger than in instances where the ester group is joined directly to the Si atom without the interposition of the $R_1$ group because hydrolysis may cause the bond between the ester group and the Si atom to decompose and eliminate the ester group which might otherwise provide lubricating properties to the magnetic recording medium. Accordingly, the presence of the $R_1$ between the ester group and the Si atom serves to a great extent to reduce the deterioration in lubricating properties with passage of time. Although the number of carbon atoms in the $R_1$ group is restricted to 5 as a matter of convenience because it is hard to provide substituents having more than 5 carbon atoms, there is no reason in theory why the substituent cannot have more than 5 carbon atoms and provide improved lubricating properties in the organo-polysiloxane compounds.

The number of carbon atoms in the group $R_2$ of the acyloxy group preferably ranges from 7 to 21 because a compound having an acyloxy group with less than 7 carbon atoms does not provide a sufficient decrease in the dynamic friction coefficient of the magnetic recording medium and tends to decrease durability of the same. An organo-polysiloxane compound having an acyloxy group of more than 21 carbon atoms, on the other hand, tends to cause excessive bleeding or blooming because it may cause a decrease in the solubility in the magnetic paint or cause an increase in the melting point of such compound.

It is assumed that the presence of fluorine atoms in the substituent $-CH_2CH_2(CF_2)_pCF_3$ and/or the substituent $-CH_2CH_2(CF_2)_qCF_3$ tends to decrease the energy which may be produced during use on the surface of a magnetic layer or a coating containing an organo-polysiloxane compound of formula (I) leading to a decrease in the dynamic friction coefficient of a magnetic recording medium provided with such compound. An organo-polysiloxane compound having a substituent with more than 12 carbon atoms substituted with fluorine atoms tends to cause a decrease in solubility in magnetic paint and tends to raise the melting point of such compounds. An organo-polysiloxane compound having an SiO moiety or moieties with each or all of the symbols l, m and n exceeding the upper range or ranges tends to cause a decrease in compatibility with a binder.

In accordance with the present invention, the organo-polysiloxane lubricants of formula (I) may be added or intermixed with magnetic particles and binders used in forming the magnetic layer formed on the non-magnetic base or the organopolysiloxane lubricants may be coated onto a magnetic layer as a top coat. The non-magnetic base may be provided with a back coating layer comprising the organo-polysiloxane lubricant on the surface opposite to the surface on which the magnetic layer is formed or the organo-polysiloxane lubricant may be added or intermixed with a back coat containing, for example, carbon or coated onto a back coat as a back top coat.

Figure 1B:
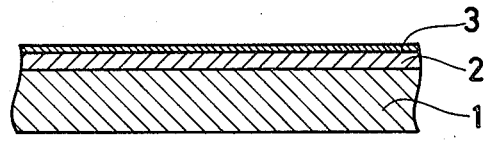
Figure 1C:
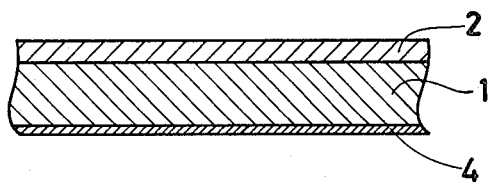
Figure 1D:
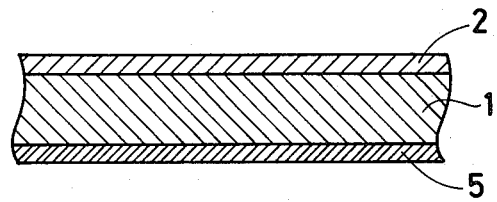
Figure 1E:
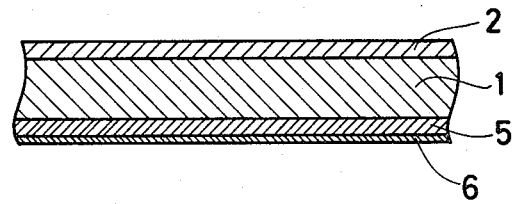

FIG. 1A illustrates an example where the organo-polysiloxane lubricant of formula (I) is coated on a non-magnetic base 1 as a magnetic layer 2 containing magnetizable particles and a binder. FIG. 1B illustrates a top coat 3 containing a lubricant coated on the magnetic layer 2. FIG. 1C illustrates an example wherein the non-magnetic base 1 has a magnetic layer 2 thereon and is provided with a back coating layer 4 on the surface of the non-magnetic base opposite to the surface coated with the magnetic layer 2. FIG. 1D shows an example of coating a back coat 5 containing the organo-polysiloxane lubricant of formula (I) on the surface of the non-magnetic base 1 with the magnetic layer 2 formed thereon opposite to the surface on which the back coat 5 is coated. FIG. 1E illustrates an example where a back top coat 6 is formed on the back coat 5 of the embodiment as shown in FIG. 1D.

In instances where the organo-polysiloxane lubricant of formula (I) is added within a magnetic layer as shown in FIG. 1A, it is preferred that the amount of the organo-polysiloxane compound range from about 0.5 to about 7 parts by weight per 100 parts by weight of magnetizable particles. The back coat 5 as shown in FIG. 1D may preferably contain lubricant in an amount of about 0.5 to 5 parts by weight. In embodiments where the organo-polysiloxane compound of formula (I) is employed for a top coat or a back top coat, the amounts of organo-polysiloxane lubricant may preferably range from about 1 to 1,000 mg/m². It should further be noted that the organo-polysiloxane lubricants of formula (I) may be employed singly or in a mixture thereof or with a lubricant of the conventional type.

The magnetic powder or magnetizable particles to be used in combination with the organo-polysiloxane compound of the formula (I) for forming a magnetic layer in magnetic recording media in accordance with the present invention may be composed of any available magnetic or magnetizable material, such as gamma hematite ($\gamma$-$Fe_2O_3$); magnetite ($Fe_3O_4$); iron oxides of non-stoichiometric oxidation compounds between gamma hematite and magnetite; gamma hematite or magnetite doped with non-ferrous atoms, such as cobalt; chromium dioxide ($CrO_2$); barium ferrite; magnetic or magnetizable alloys, such as an iron-cobalt alloy (Fe-Co), iron nickel alloy (Fe-Ni), iron-cobalt-nickel alloy (Fe-Co-Ni), iron-cobalt-boron alloy (Fe-Co-B), iron-cobalt-chromium-boron alloy (Fe-Co-Cr-B), manganese-bismuth alloy (Mn-Bi), manganese-aluminum alloy (Mn-Al) or iron-cobalt-vanadium alloy (Fe-Co-V); iron nitride, mixtures of the above or other magnetic or magnetizable materials.

The binder used in magnetic recording media produced in accordance with the present invention may be any resinous binder which can be employed for this purpose. The resinous binder may include, for example, vinyl chloride-vinyl acetate copolymers, vinyl chloride-vinyl acetate-vinyl alcohol copolymers, vinyl chloride-vinyl acetate-maleic acid copolymers, vinyl chloride-vinylidene chloride copolymers, vinyl chloride-acrylonitrile copolymers, acrylic acid ester-acrylonitrile copolymers, acrylic acid ester-vinylidene chloride copolymers, methacrylic acid ester-vinylidene chloride copolymers, methacrylic acid ester-styrene copolymers, thermoplastic polyurethane resins, phenoxy resins, vinyl polyfluoride, vinylidene chloride-acrylonitrile copolymers, butadiene-acrylonitrile copolymers, acrylonitrile-butadiene-acrylic acid copolymers, acrylonitrile-butadiene-methacrylic acid copolymers, polyvinyl butyral, polyvinyl acetal, cellulose derivatives, styrene-butadiene copolymers, polyester resins, phenol resins, epoxy resins, thermosetting polyurethane resins, urea resins, melamine resins, alkyd resins, urea-formaldehyde resins, mixtures thereof or other like resinous binders.

A reinforcement material capable of being used in the magnetic layer of magnetic recording media in accordance with the present invention may include, for example, aluminum oxide, chromium oxide, silicon oxide or mixtures thereof.

Magnetic recording media produced in accordance with the present invention may also contain antistatic agents of the type that can be used with magnetic recording media. An example of a suitable antistatic agent is finely divided carbon black. Further, dispersing agents, such as lecithin and the like, may be added to a magnetic layer of a magnetic recording medium in accordance with the present invention.

The organic solvent to be used with the magnetic powder or magnetizable particles and the binder for preparing a magnetic paint to be coated on a non-magnetic base may include, for example, alcohols, such as methanol, ethanol, propanol and butanol; ketones, such as acetone, methylethylketone, methylisobutylketone and cyclohexanone; esters, such as methyl acetate, ethyl acetate, butyl acetate, ethyl lactate and glycol diacetate; ethers, such as monoethylether; glycol ethers, such as ethylene glycol monoethyl ether, ethylene glycol dimethyl ether and dioxane; aromatic hydrocarbons, such as benzene, toluene and xylene; aliphatic hydrocarbons, such as hexane and heptane; nitropropane; mixtures thereof or other suitable organic solvents.

The magnetic recording medium in accordance with the present invention may comprise any of the known forms, such as magnetic recording tapes having a flexible non-magnetic film base and magnetic discs having a relatively rigid non-magnetic base. The flexible non-magnetic film bases may include, for example, polyesters, such as polyethylene terephthalate; polyolefins, such as polypropylene; cellulose derivatives, such as cellulose diacetate and cellulose triacetate; polycarbonates; polyimides; metallic materials, such as aluminum and copper; papers; or any other suitable materials. The rigid non-magnetic bases may be composed of, for example, a ceramic or a metal, such as aluminum plate.

In embodiments where the organo-polysiloxane compound of the formula (I) is employed in the back coat of a magnetic recording medium in accordance with the invention, the back coat may comprise, for example, carbon, such as furnace carbon, channel carbon, acetylene carbon, thermal carbon and lamp carbon; inorganic pigments, such as gamma-FeOOH, alpha-Fe$_2$O$_3$, Cr$_2$O$_3$, TiO$_2$, ZnO, SiO, SiO$_2$.2H$_2$O, Al$_2$O$_3$.2SiO$_2$.2H$_2$O, 3MgO.4SiO$_2$.H$_2$O, MgCO$_3$.Mg(OH)$_2$.3H$_2$O, Al$_2$O$_3$ and Sb$_2$O$_3$.

In instances where the organo-polysiloxane compound of the formula (I) is employed in the top coat formed on the surface of the magnetic layer or the back coat or in the coating layer coated on the surface of the non-magnetic base, the organo-polysiloxane lubricant or lubricants may be added or intermixed with one or more of the aforesaid binders in one or more of the aforementioned organic solvents.

The following organo-polysiloxane compounds which were employed in the working examples in the practice of the present invention were prepared as follows:

Preparation of Organo-polysiloxane Compound I

An organo-polysiloxane compound I having the following formula was prepared:

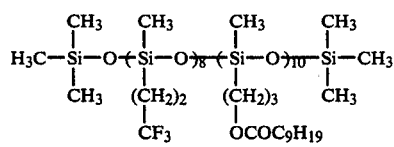

A mixture of 212 grams of allyl caproate, 0.26 gram of a 2% 2-ethylhexanol solution of chloroplatinic acid and 200 grams of toluene was charged into a four-necked flask equipped with a reflux condenser, a thermometer, a stirrer and a dropping funnel and heated to 80° C. To this mixture was added dropwise 201 grams of a silicone compound having the following formula:

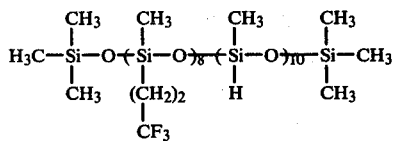

The dropwise addition of the silicone compound caused an exothermic reaction which raised the solution temperature to 106° C. at the time when the addition was completed. The solution was further heated to 110° C. at which it was reacted for 5 hours. The removal of toluene by distillation under reduced pressure gave 408 grams of pale yellow liquid which in turn was determined to have the structure as hereinabove set forth by measurements for its infrared absorption spectrum (IR) and nuclear magnetic resonance (NMR). Its specific gravity at 25° C. was 1.048, its viscosity was 133 centistokes, and its refractive index was 1.4252.

Preparation of Organo-polysiloxane Compound II

The organo-polysiloxane compound II has the following formula:

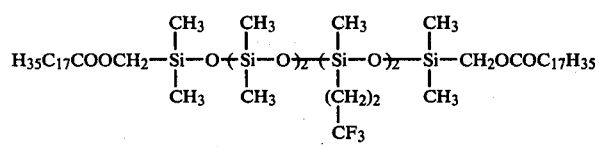

A three-necked flask equipped with a reflux condenser, a stirrer, and a thermometer was supplied with a mixture of 40.5 grams of triethylamine, 300 grams of toluene and 138.2 grams of a silicone compound having the following formula:

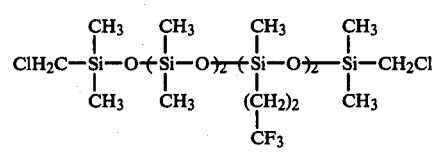

After the mixture was heated to 80° C., 113.8 grams of stearic acid were added thereto with stirring. The mixture was reacted for 7 hours under reflux of toluene and then cooled to precipitate triethylamine hydrochloride which in turn was removed by filtration. The removal of low boiling point materials under reduced pressure gave 219.6 grams of a pale yellow waxy solid which was found to have a melting point of 54° C. and confirmed to have the structure as hereinabove set forth by measurements of its infrared absorption spectrum and nuclear magnetic resonance.

Preparation of Organo-polysiloxane Compounds III–XIV

The procedures employed for the preparation of the organo-polysiloxane compound I or II were followed to provide organo-polysiloxane compounds III to XIV, inclusive, as follows:

Compound III:

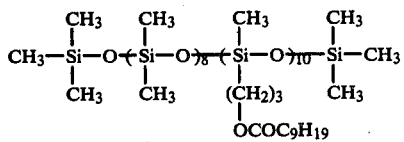

Viscosity (at 25° C. - 85.5 cSt
Specific gravity (at 25° C.) = 0.965
Refractive index (at 25° C.) = 1.4397

Compound IV:

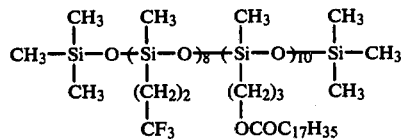

Melting point - 34° C.

Compound V:

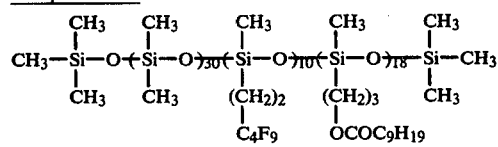

Viscosity (at 25° C.) = 351.8 cSt
Specific gravity (at 25° C.) = 1.114
Refractive index (at 25° C.) = 1.4100

Compound VI:

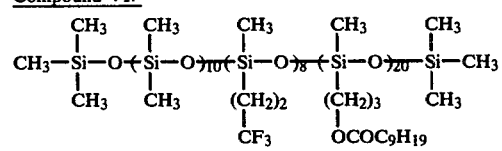

Viscosity (at 25° C.) = 297.9 cSt
Specific gravity (at 25° C.) = 1.015
Refractive index (at 25° C.) = 1.4334

Compound VII:

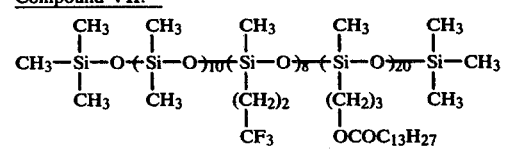

Viscosity (at 25° C.) = 342.5 cSt
Specific gravity (at 25° C.) = 0.986
Refractive index (at 25° C.) = 1.4395

Compound VIII:

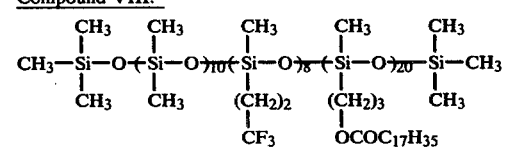

Melting point = 36° C.

Compound IX:

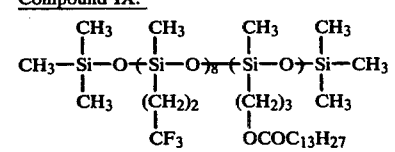

Melting point = 22° C.

Compound X:

-continued

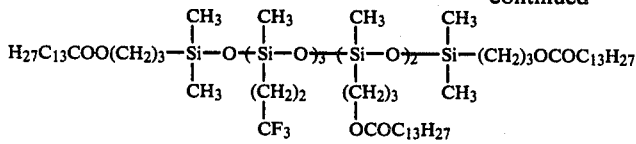

Melting point = 23° C.

Compound XI:

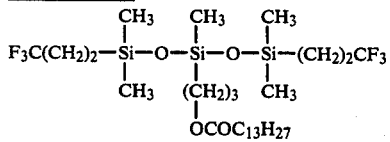

Viscosity (at 25° C.) = 11.9 cSt
Specific gravity (at 25° C.) = 1.008
Refractive index (at 25° C.) = 1.4161

Compound XII:

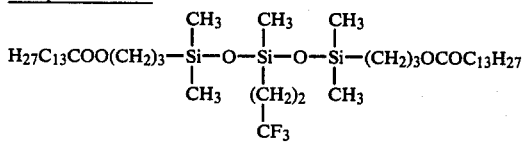

Viscosity (at 25° C.) = 22.6 cSt
Specific gravity (at 25° C.) = 1.005
Refractive index (at 25° C.) = 1.4257

Compound XIII:

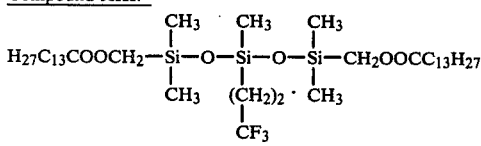

Melting point - 43° C.

Compound XIV:

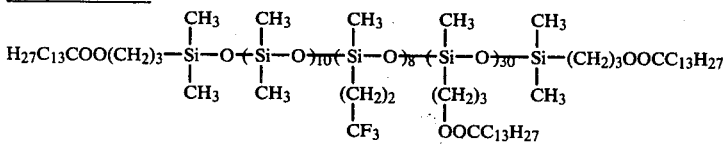

A magnetic paint composition which was employed for all the working examples for the magnetic recording media in accordance with the present invention had the following components:

| Components | Parts by weight |
|---|---|
| gamma-$Fe_2O_3$ | 100 |
| Vinyl chloride-vinyl acetate copolymer (trade name "VAGH", manufactured by Union Carbide Corp.) | 18 |
| Polyurethane resin (trade name "Estan 5702", manufactured by B. F. Goodrich Co.) | 12 |
| Carbon (antistatic agent) | 0.5 |
| Lecithin (dispersing agent) | 1.0 |
| Solvents | |
| Methylethylketone | 150 |
| Methylisobutylketone | 150 |

EXAMPLE 1

To the aforesaid magnetic paint composition were added 2.0 parts by weight of Compound I per 100 parts by weight of gamma-$Fe_2O_3$, and the mixture was ball milled for 24 hours. After filtration, 3 parts by weight of isocyanate were added thereto and the mixture was stirred for 30 minutes. The resulting mixture was then coated on a 12-micron thick polyethylene terephthalate film base so as to give a dry film thickness of 5 microns. The film base was oriented and rolled upon itself after drying. The rolled film was then subjected to surface treatment and cut to a half inch.

The tape thus prepared was then measured for its "still" performance, dynamic friction coefficient, and degree of bleeding or blooming by visible observation. The results are shown in Table I below.

EXAMPLES 2–9

The procedures of Example 1 were followed with the exception that, in place of Compound I, each of 2.0 parts by weight, per 100 parts by weight of gamma-$Fe_2O_3$, of Compound III (Example 2), Compound IV (Example 3), Compound V (Example 4), Compound VI (Example 5), Compound VII (Example 6), Compound VIII (Example 7), Compound IX (Example 8) and Compound XIV (Example 9) was added.

The results of their performance with respect to still performance, dynamic friction coefficient and a degree of blooming are shown in Table I below.

Figure 2:
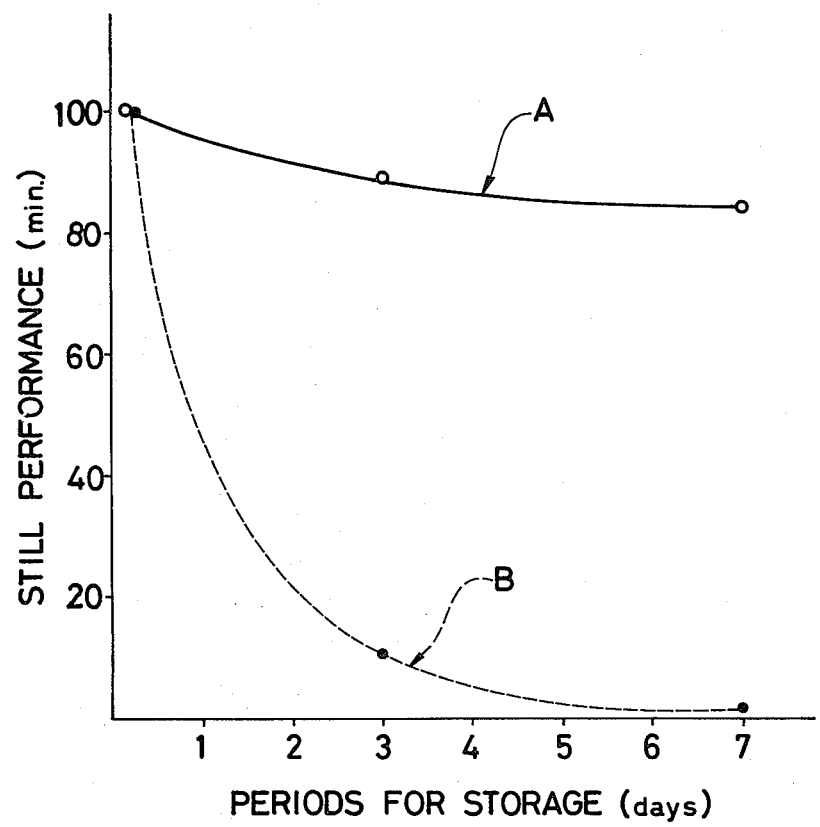
FIG. 2 is a graph illustrating the relationship between still performance and periods for storage.

The tape prepared in accordance with Example 9 was also measured for variations in "still" performance with periods of time in an atmosphere having a temperature of 45° C. and a relative humidity of 80%. The results are shown in FIG. 2 as line A.

EXAMPLES 10-13

The procedures of Example 1 were followed with the exception that, in place of 2.0 parts by weight of Compound I, 1.0 part by weight of Compound II (Example 10), Compound X (Example 11), Compound XII (Example 12) and Compound XIII (Example 13), respectively, was added.

The results of their performance are shown in Table I below.

EXAMPLE 14

The procedures of Example 1 were followed with the exception that, in place of 2.0 parts by weight of Compound I, 3.0 parts by weight of Compound XI per 100 parts by weight of the magnetic powder were added.

The results of its performance are shown in Table I below.

EXAMPLE 15

Figure 3:
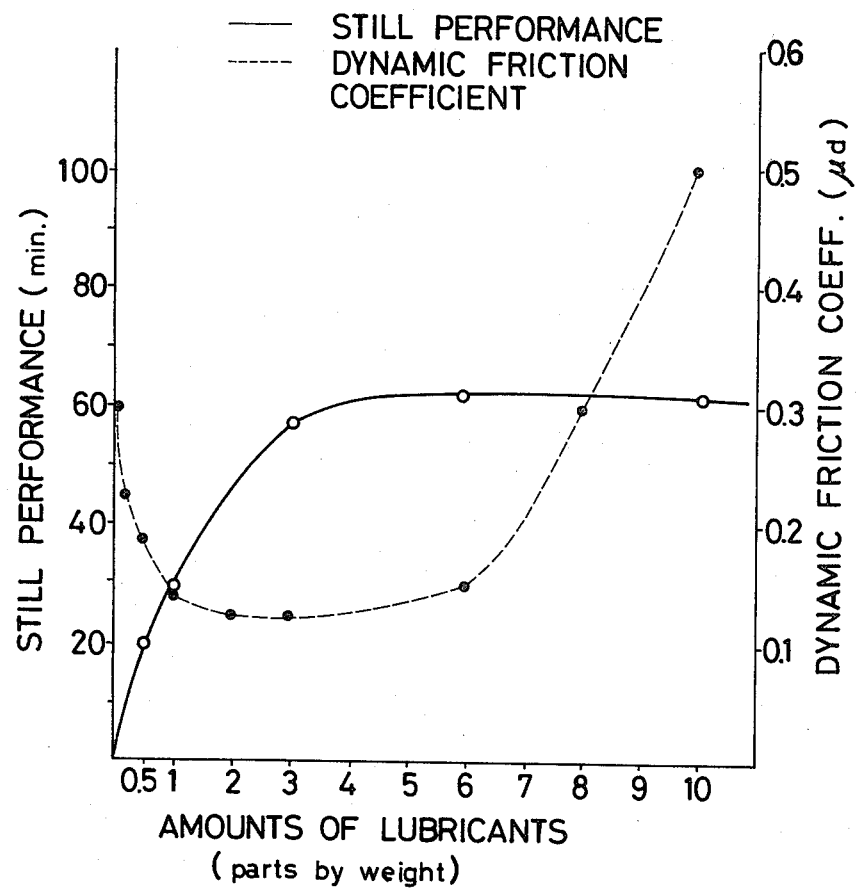
FIG. 3 is a graph illustrating the relationship of "still" performance and dynamic friction coefficients with relation to the amounts of lubricants dispersed in the magnetic layer.
Figure 4:
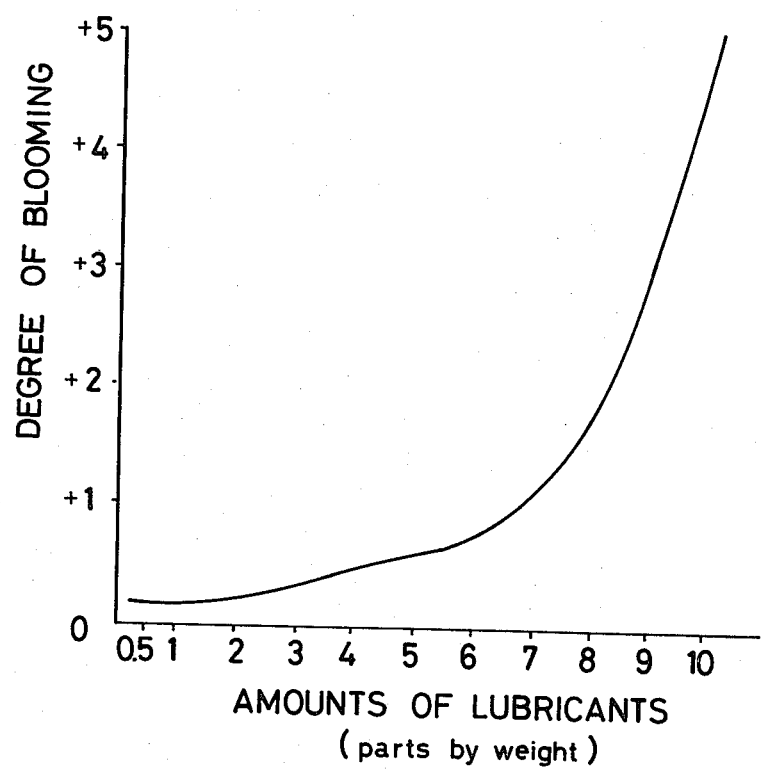
FIG. 4 is a graph illustrating the relationship between the degree of blooming and amounts of lubricants dispersed in the magnetic layer.

The procedures of Example 1 were followed by varying amounts of Compound IX to be employed with the aforesaid magnetic paint composition. The resulting tapes were determined for their "still" performance and dynamic friction coefficients as illustrated in FIG. 3. FIG. 4 illustrates the degrees of bleeding or blooming which occurred on the tapes tested. It was found in FIGS. 3 and 4 that the preferred amounts of Compound IX and consequently the organo-polysiloxane compounds of the formula (I) ranged from about 0.5 to about 7 parts by weight.

Where the lubricant was employed in amounts lower than 0.5 parts by weight, the still performance was made shorter while dynamic friction coefficients ($\mu d$) and degrees of bleeding or blooming were sufficient. Where the lubricant was employed in amounts larger than 7 parts by weight, on the other hand, increases in the dynamic friction coefficient and the degree of blooming occurred.

COMPARATIVE EXAMPLES 1-2

Conventional lubricants were employed with the aforesaid magnetic paint composition for comparative purposes in place of the organo-polysiloxane lubricants in accordance with the present invention. Comparative Example 1 employed dimethylsilicone oil (trade name "KF 96", manufactured by Shin-Etsu Chemical Co., Ltd.) and Comparative Example 2 employed methylphenylsilicone oil (trade name "KF 54", manufactured by Shin-Etsu Chemical Co., Ltd.) as lubricants.

The results for their performance are also shown in Table I below for comparative purposes.

COMPARATIVE EXAMPLE 3

The tape was prepared by following the procedures of Example 14 with the exception that, in place of Compound I, there was used an organo-polysiloxane lubricant having the following formula:

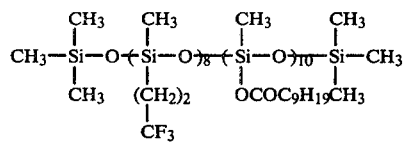

The results of its performance are shown in Table 1 below.

Following Comparative Example 3, the tapes were prepared by using the organo-polysiloxane lubricant of the above formula in 0.5 and 7 parts by weight, respectively.

Their still performance when measured as with Example 9 are also shown in FIG. 2 as line B.

TABLE I

| Tapes | Still Performance[1] (min.) | Dynamic Friction[2] Coefficient ($\mu d$) | Degree of Blooming[3] |
|---|---|---|---|
| Example 1 | more than 60 | 0.190 | Little |
| Example 2 | " | 0.217 | " |
| Example 3 | " | 0.186 | " |
| Example 4 | " | 0.280 | " |
| Example 5 | " | 0.279 | " |
| Example 6 | " | 0.130 | " |
| Example 7 | " | 0.162 | " |
| Example 8 | " | 0.137 | " |
| Example 9 | " | 0.145 | " |
| Example 10 | more than 30 | 0.241 | " |
| Example 11 | " | 0.169 | " |
| Example 12 | " | 0.205 | " |
| Example 13 | " | 0.200 | " |
| Example 14 | more than 60 | 0.335 | " |
| Comparative Example 1 | less than 5 | 0.400 | Some |
| Comparative Example 2 | " | 0.443 | " |
| Comparative Example 3 | " | 0.200 | Little |

[1] The term "still performance" referred to throughout the specification is defined as the period of time required for reduction of the reproduction output to one-half of the original reproduction output in still mode where an upper rotary cylinder with a magnetic head is rotated while the tape is not transported.

[2] The dynamic friction coefficient ($\mu d$) is measured as follows: A tape of ¼ inch width is contacted with the periphery of a brass cylinder over about a quadrant of the peripheral surface of such cylinder. One end of the tape is horizontally fixed to a support and a weight of 100 grams is fixed to the other free end of the tape to provide a given tension on the latent portion of the tape. The cylinder is then controllably rotated at such a rate that the peripheral speed thereof is 0.75 mm per second relative to the tape. Tension gauges are arranged on the tape between the weight and the cylinder and between the cylinder and the support respectively, whereby tensions $t_1$ and $t_2$ are then measured. The dynamic friction coefficient ($\mu d$) is then calculated by the following equation:

$$\mu d = \frac{2}{\pi} \log_e \frac{t_2}{t_1}$$

[3] The degree of blooming or bleeding is visibly observed and rated in accordance with an extent to which the blooming or bleeding occurs on the surface of a tape.

EXAMPLES 16-18

A magnetic layer was formed on the surface of a polyethylene terephthalate by following the procedures of Example 1 with the exception that 1.5 parts by weight of squalane ($C_{30}H_{62}$) was used in place of the lubricant.

On the surface of the magnetic layer on the non-magnetic layer was coated a 1% isopropylalcohol solution of each of Compound I, II and XI, respectively, as a top coat as shown in FIG. 1B, so as to amount to 43 mg/m².

COMPARATIVE EXAMPLES 4-6

The procedures of Example 16 were followed with the exception that, in place of the organo-polysiloxane lubricants of the formula (I), the conventional lubricants of Comparative Example 1 and Comparative Example 2 and the organo-polysiloxane compound of Comparative Example 3 were employed, respectively.

The tapes obtained in Examples 16 to 18 and Comparative Examples 4 to 6, respectively, were determined for still performance, dynamic friction coefficient and "Q" sound. The test results are shown in Table II below.

TABLE II

| Tapes | Still Performance (min.) | Dynamic Friction Coefficient ($\mu d$) | "Q" sound[4] |
|---|---|---|---|
| Example 16 | more than 60 | 0.182 | None |
| Example 17 | " | 0.195 | " |
| Example 18 | " | 0.165 | " |
| Comparative Example 4 | less than 10 | 0.386 | Pretty much |
| Comparative Example 5 | " | 0.410 | Pretty much |
| Comparative Example 6 | " | 0.187— | None |

[4]The "Q" sound (fluttering of magnetic recording tape is determined by loading the ¼ inch tapes into a professional tape recorder and running it under a back tension.

EXAMPLE 19–20

A polyethylene terephthalate base is coated with a 0.1% "Freon" solution of each of Compound XIV (Example 19) and Compound X (Example 20), respectively, so as to amount to 2.1 mg/m² as a coating on the surface opposite to the surface on which the magnetic layer is formed.

The tapes were determined for their dynamic friction coefficient, $\mu d$, respectively, at the first running and the 10th running. The results are shown in Table III.

COMPARATIVE EXAMPLE 7

A tape of Example 19 without any coating containing an organo-polysiloxane lubricant in accordance with the present invention was prepared and tested for its dynamic friction coefficient, $\mu d$. The result is shown in Table III below.

TABLE III

| | Dynamic Friction Coefficient, $\mu d$ | |
|---|---|---|
| Tapes | First Running | 10th Running |
| Example 19 | 0.188 | 0.241 |
| Example 20 | 0.157 | 0.196 |
| Comparative Example 7 | 0.254 | 0.319 |

EXAMPLE 21

A paint composition having the following components was employed for a back coat to be coated on the surface opposite to the surface on which the magnetic layer was coated:

| Components | Parts by weight |
|---|---|
| Carbon | 100 |
| Polyurethane resin (trade name "Estan 5702") | 50 |
| Epoxy resin (trade name "Epiclon 351", manufactured by Dainippon Ink & Chemical Co., Ltd.) | 50 |
| Methylethylketone | 400 |
| Toluene | 400 |
| "Desmodur L" (trade name of Bayer A.G.) | 20 |

The mixture was mixed with 4 parts by weight of Compound XIV and coated on the opposite side of a base having a magnetic layer thereon so as to give a dry film thickness of 3 microns as a back coat as shown in FIG. 1D.

The dynamic friction coefficients were found to be 0.150 $\mu d$ at the first running and 0.160 at the 10th running when measured in the same manner as hereinabove set forth.

EXAMPLE 22

A coating of Compound XIV was formed on the back coat as in Example 21 as a top back coat so as to be coated in an amount of 43 mg/m² as shown in Table 1E. The dynamic friction coefficients of this tape were found to be 0.167 $\mu d$ at the first running and 0.167 $\mu d$ at the 10th running.

We claim as our invention:

1. A magnetic recording medium comprising a non-magnetic base and a magnetic layer comprising magnetic particles in a binder, in which the non-magnetic base is provided with a layer containing at least one organo-polysiloxane compound represented by the formula (I):

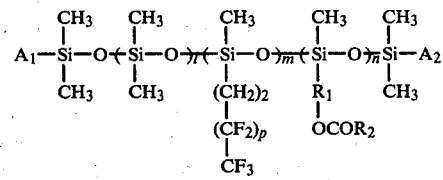

(wherein each of $A_1$ and $A_2$ is independently $-CH_3$, $-CH_2-CH_2-(CF_2)_q-CF_3$ or $-R_1OCOR_2$; $R_1$ is a divalent hydrocarbon residue having 1 to 5 carbon atoms; $R_2$ is a monovalent hydrocarbon residue having from 7 to 21 carbon atoms; each of l, m and n is independently 0 or an integer ranging from 1 to 200; and each of p and q is independently 0 or an integer ranging from 1 to 12; provided that when at least one of $A_1$ and $A_2$ is the group $-R_1OCOR_2$, each of l, m and n may be 0 and that, when both $A_1$ and $A_2$ are groups other than the group $-R_1OCOR_2$, each of l and m may be 0 and n is an integer ranging from 1 to 200), said organopolysiloxane being contained in said magnetic layer, in a coating over said magnetic layer or on the opposite side from said magnetic layer.

2. A magnetic recording medium according to claim 1, wherein the organo-polysiloxane compound is contained in a layer provided over the surface of the magnetic layer.

3. A magnetic recording medium according to claim 1, wherein the organo-polysiloxane compound is contained in a layer provided on a surface opposite to the surface of the non-magnetic base on which the magnetic layer is formed.

4. A magnetic recording medium according to claim 1, wherein the organo-polysiloxane compound is contained in a back coat provided on a surface opposite to the surface of the non-magnetic base on which the magnetic layer is formed.

5. A magnetic recording medium according to claim 4, wherein the organo-polysiloxane compound is contained in a layer provided on the surface of the back coat.

6. A magnetic recording medium according to claim 1, wherein the organo-polysiloxane compound is one in which $A_1$ and $A_2$ are each methyl groups, the group $-R_1OCOR_2$ is $-(CH_2)_3OCOC_9H_{19}$, $l$ is 0, $m$ is 8, $n$ is 10, and $p$ is 0.

7. A magnetic recording medium according to claim 1 wherein the organo-polysiloxane compound is one in which $A_1$ and $A_2$ are each $-CH_2OCOC_{17}H_{35}$, $l$ is 2, $m$ is 2, $n$ is 0, and $p$ is 0.

8. A magnetic recording medium according to claim 1, wherein the organo-polysiloxane compound is one in which $A_1$ and $A_2$ are each methyl groups, the group $-R_1OCOR_2$ is $-(CH_2)_3OCOC_9H_{19}$, $l$ is 8, $m$ is 0, and $n$ is 10.

9. A magnetic recording medium according to claim 1, wherein the organo-polysiloxane compound is one in which $A_1$ and $A_2$ are each methyl groups, the group $-R_1OCOR_2$ is $-(CH_2)_3OCOC_{17}H_{35}$, $l$ is 0, $m$ is 8, $n$ is 10, and $p$ is 0.

10. A magnetic recording medium according to claim 1 wherein the organo-polysiloxane compound is one in which $A_1$ and $A_2$ are each methyl groups, the group $-R_1OCOR_2$ is $-(CH_2)_3OCOC_9H_{19}$, $l$ is 30, $m$ is 10, $n$ is 18, and $p$ is 3.

11. A magnetic recording medium according to claim 1 wherein the organo-polysiloxane compound is one in which $A_1$ and $A_2$ are each methyl groups, the group $-R_1OCOR_2$ is $-(CH_2)_3OCOC_9H_{19}$, $l$ is 10, $m$ is 8, $n$ is 20, and $p$ is 0.

12. A magnetic recording medium according to claim 1 wherein the organo-polysiloxane compound is one in which $A_1$ and $A_2$ are each methyl groups, the group $-R_1OCOR_2$ is $-(CH_2)_3OCOC_{13}H_{27}$, $l$ is 10, $m$ is 8, $n$ is 20, and $p$ is 0.

13. A magnetic recording medium according to claim 1 wherein the organo-polysiloxane compound is one in which $A_1$ and $A_2$ are each methyl groups, the group $-R_1OCOR_2$ is $-(CH_2)_3OCOC_{17}H_{35}$, $l$ is 10, $m$ is 8, $n$ is 20, and $p$ is 0.

14. A magnetic recording medium according to claim 1 wherein the organo-polysiloxane compound is one in which $A_1$ and $A_2$ are each methyl groups, the group $-R_1OCOR_2$ is $-(CH_2)_3OCOC_{13}H_{27}$, $l$ is 0, $m$ is 8, $n$ is 1, and $p$ is 0.

15. A magnetic recording medium according to claim 1 wherein the organo-polysiloxane compound is one in which $A_1$ and $A_2$ are each $-(CH_2)_3OCOC_{13}H_{27}$, the group $-R_1OCOR_2$ is $-(CH_2)_3OCOC_{13}H_{27}$, $l$ is 0, $m$ is 3, $n$ is 2, and $p$ is 0.

16. A magnetic recording medium according to claim 1 wherein the organo-polysiloxane compound is one in which $A_1$ and $A_2$ are each $-(CH_2)_2CF_3$, the group $-R_1OCOR_2$ is $-(CH_2)_3OCOC_{13}H_{27}$, $l$ is 0, $m$ is 0, and $n$ is 1.

17. A magnetic recording medium according to claim 1 wherein the organo-polysiloxane compound is one in which $A_1$ and $A_2$ are each $-(CH_2)_3OCOC_{13}H_{27}$, $l$ is 0, $m$ is 1, $n$ is 0, and $p$ is 0.

18. A magnetic recording medium according to claim 1 wherein the organo-polysiloxane compound is one in which $A_1$ and $A_2$ are $-CH_2OCOC_{13}H_{27}$, $l$ is 0, $m$ is 1, $n$ is 0, and $p$ is 0.

19. A magnetic recording medium according to claim 1 wherein the organo-polysiloxane compound is one in which $A_1$ and $A_2$ are each $-(CH_2)_3OCOC_{13}H_{27}$, the group $-R_1OCOR_2$ is $-(CH_2)_3OCOC_{13}H_{27}$, $l$ is 10, $m$ is 8, $n$ is 30, and $p$ is 0.

* * * * *